US012155554B2

(12) United States Patent
Arzani et al.

(10) Patent No.: US 12,155,554 B2
(45) Date of Patent: Nov. 26, 2024

(54) NETWORK TRAFFIC CONTROL USING ESTIMATED MAXIMUM GAP

(71) Applicant: Microsoft Technology Licensing, LLC, Redmond, WA (US)

(72) Inventors: Behnaz Arzani, Redmond, WA (US); Pooria Namyar, Los Angeles, CA (US); Ryan Andrew Beckett, Redmond, WA (US); Srikanth Kandula, Redmond, WA (US); Santiago Martin Segarra, Houston, TX (US); Himanshu Raj, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 17/929,503

(22) Filed: Sep. 2, 2022

(65) Prior Publication Data
US 2024/0080255 A1    Mar. 7, 2024

(51) Int. Cl.
*H04L 45/02*    (2022.01)

(52) U.S. Cl.
CPC .................. *H04L 45/08* (2013.01)

(58) Field of Classification Search
CPC ......... H04L 45/08; H04L 45/14; H04L 47/00; H04L 47/10
See application file for complete search history.

(56) References Cited

U.S. PATENT DOCUMENTS

| | | | |
|---|---|---|---|
| 6,411,946 B1* | 6/2002 | Chaudhuri | H04L 45/08 705/40 |
| 2002/0095493 A1* | 7/2002 | Byrnes | H04L 45/14 709/224 |
| 2021/0383246 A1* | 12/2021 | Wee | G06N 3/006 |

OTHER PUBLICATIONS

"Abilene Core Topology", In Stanford University IT, Dec. 9, 2015, 1 Page.
Abuzaid, et al., "Contracting Wide-Area Network Topologies to Solve Flow Problems Quickly", In Proceedings of the 18th USENIX Symposium on Networked Systems Design and Implementation, Apr. 12, 2021, pp. 175-200.
Ahuja, et al., "Capacity-Efficient and Uncertainty-Resilient Backbone Network Planning with Hose", In Proceedings of the ACM SIGCOMM 2021 Conference, Aug. 23, 2021, pp. 547-559.
(Continued)

*Primary Examiner* — Kan Yuen
(74) *Attorney, Agent, or Firm* — Alleman Hall & Tuttle LLP

(57) ABSTRACT

A computing device is provided, including a processor that receives a network graph. The processor further receives a specification of a network traffic control heuristic for a network traffic routing problem over the network graph. The processor further constructs a gap maximization problem that has, as a maximization target, a difference between an exact solution to the network traffic routing problem and a heuristic solution generated using the network traffic control heuristic. The processor further generates a Lagrange multiplier formulation of the gap maximization problem. At a convex solver, the processor further computes an estimated
(Continued)

maximum gap as an estimated solution to the Lagrange multiplier formulation of the gap maximization problem. The processor further performs a network traffic control action based at least in part on the estimated maximum gap.

20 Claims, 13 Drawing Sheets

(56) References Cited

OTHER PUBLICATIONS

Al-Fares, et al., "Hedera: Dynamic Flow Scheduling for Datacenter Networks", In Proceedings of the 7th USENIX Symposium on Networked Systems Design and Implementation, Apr. 28, 2010, 15 Pages.
Arguello, et al., "Modeling Bilevel Programs in Pyomo", In Proceedings of 2nd International Workshop on Bilevel Programming, Jun. 1, 2018, 34 Pages.
Bogle, et al., "TEAVAR: Striking the Right Utilization-Availability Balance in WAN Traffic Engineering", In Proceedings of the ACM Special Interest Group on Data Communication, Aug. 19, 2019, pp. 29-43.
Boyd, et al., "Convex Optimization", In Proceedings of Cambridge University Press, Mar. 8, 2004, 730 Pages.
Colson, et al., "An overview of bilevel optimization", In Annals of operations research, vol. 153, Issue 1, Sep. 2007, pp. 235-256.
Colson, et al., "Bilevel programming: A survey", In Journal of 4OR: Quarterly Journal of the Belgian, French and Italian Operations Research Societies, vol. 3, Issue 2, Jun. 2005, pp. 87-108.
Cormen, et al., "Introduction to Algorithms", In MIT press, Apr. 5, 2022, 1313 Pages.
Corso, et al., "A Survey of Algorithms for Black-Box Safety Validation of Cyber-Physical Systems", In Journal of Artificial Intelligence Research, vol. 72, Oct. 13, 2021, 52 Pages.
Wang, et al., "FLAML: A Fast and Lightweight AutoML Library", In Fourth Conference on Machine Learning and Systems, Apr. 5, 2021, 14 Pages.
De Moura, et al., "Z3: An Efficient SMT Solver", In 14th International conference on Tools and Algorithms for the Construction and Analysis of Systems, vol. 4963, Mar. 29, 2008, pp. 337-340.
Garcia-Herreros, et al., "Mixed-integer Bilevel Optimization for Capacity Planning with Rational Markets", In Journal of Computers & Chemical Engineering, vol. 86, Mar. 4, 2016, pp. 1-34.
Gilad, et al., "Robustifying Network Protocols with Adversarial Examples", In Proceedings of the 18th ACM Workshop on Hot Topics in Networks, Nov. 13, 2019, pp. 85-92.
Zhong, et al., "ARROW: Restoration-Aware Traffic Engineering", In Proceedings of the ACM SIGCOMM Conference, Aug. 23, 2021, pp. 560-579.
Hong, et al., "Achieving High Utilization With Software-Driven WAN", In Proceedings of the ACM SIGCOMM Conference on SIGCOMM, Aug. 12, 2013, pp. 15-26.
Jain, et al., "B4: Experience with a Globally-deployed Software Defined Wan", In Proceedings of the Conference ACM SIGCOMM, Aug. 12, 2013, pp. 3-14.
Jalaparti, et al., "Dynamic Pricing and Traffic Engineering for Timely Inter-Datacenter Transfers", In Proceedings of The ACM SIGCOMM Conference, Aug. 22, 2016, pp. 73-86.
Jeyakumar, et al., "EyeQ: Practical Network Performance Isolation for the Multi-tenant Cloud", In Proceedings of 4th USENIX Workshop on Hot Topics in Cloud Computing, Jun. 12, 2012, pp. 1-6.
Jhala, et al., "Software Model Checking", In Journal of ACM Computing Surveys, vol. 41, No. 4, Article 21, Oct. 2009, 54 Pages.
Kang, et al., "Probabilistic Profiling of Stateful Data Planes for Adversarial Testing", In Proceedings of the 26th ACM International Conference on Architectural Support for Programming Languages and Operating Systems, Apr. 19, 2021, pp. 286-301.
Kirkpatrick, et al., "Optimization by Simulated Annealing", In Journal of Science, New Series, vol. 220, Issue 4598, May 13, 1983, pp. 671-680.
Krishnaswamy, et al., "Decentralized cloud wide-area network traffic engineering with BlastShield", In Proceedings of the 19th USENIX Symposium on Networked Systems Design and Implementation, Apr. 4, 2022, pp. 325-338.
Kumar, et al., "BwE: Flexible, hierarchical bandwidth allocation for wan distributed computing", In Proceedings of the ACM Conference on Special Interest Group on Data Communication, Aug. 17, 2015, pp. 1-14.
Li, "A review of dynamic stackelberg game models", In Discrete & Continuous Dynamical Systems-B, vol. 22, Issue 1, Jan. 2017, pp. 125-159.
Liu, et al., "Traffic Engineering with Forward Fault Correction", In Proceedings of the ACM Conference on SIGCOMM, Aug. 17, 2014, pp. 527-538.
Meier, et al., "(Self) Driving Under the Influence: Intoxicating Adversarial Network Inputs", In Proceedings of the 18th ACM Workshop on Hot Topics in Networks, Nov. 13, 2019, 09 Pages.
Motwani, et al., "Randomized Algorithms", In Publication of Cambridge University Press, Aug. 25, 1995, 488 Pages.
Narayanan, et al., "Solving Large-Scale Granular Resource Allocation Problems Efficiently with POP", In Proceedings of the ACM SIGOPS 28th Symposium on Operating Systems Principles, Oct. 26, 2021, pp. 521-537.
Pedrosa, et al., "Automated synthesis of adversarial workloads for network functions", In Proceedings of the Conference of the ACM Special Interest Group on Data Communication, Aug. 20, 2018, pp. 372-385.
Reviriego, et al., "Breaking Cuckoo Hash: Black Box Attacks", In Journal of IEEE Transactions on Dependable and Secure Computing, vol. 19, Issue 4, Jul. 1, 2022, pp. 2421-2427.
Sauerwald, Thomas, "Sorting Networks", Retrieved from: https://www.cl.cam.ac.uk/teaching/1415/AdvAlgo/advalg.pdf, 2015, 295 Pages.
Singh, et al., "Cost-Effective Capacity Provisioning in Wide Area Networks with Shoofly", In Proceedings of the ACM SIGCOMM Conference, Aug. 23, 2021, pp. 534-546.
Steinruecken, et al., "The Automatic Statistician", In Publication of Springer, May 18, 2019, pp. 161-173.
Majidi, et al., "Adaptive Routing Reconfigurations to Minimize Flow Cost in SDN-Based Data Center Networks", In Proceedings of the 48th International Conference on Parallel Processing, Aug. 5, 2019, 10 Pages.
"International Search Report and Written Openion issued in PCT Application No. PCT/US23/028907", Mailed Date : Oct. 11, 2023, 12 Pages.
Vignac, et al., "Hierarchical Optimization Procedure for Traffic Grooming in WDM Optical Networks", In Proceedings of the International Conference on Optical Network Design and Modeling, Feb. 18, 2009, 6 Pages.

* cited by examiner

| DEMAND | | DP (THRESH=50) | | OPT | |
|---|---|---|---|---|---|
| SRC-DEST | VALUE | PATH | VALUE | PATH | VALUE |
| A-C | 50 | A-B-C | 50 | A-D-E-C | 50 |
| D-E | 10 | D-E | 10 | D-E | 10 |
| A-B | 100 | A-B | 50 | A-B | 100 |
| B-C | 100 | B-C | 50 | B-C | 100 |
| | | TOTAL DP | 160 | TOTAL OPT | 260 |

NETWORK TRAFFIC CONTROL USING ESTIMATED MAXIMUM GAP

BACKGROUND

Levels of traffic in different portions of a computer network often vary significantly over time. To account for such variation, network traffic may be routed along different paths through the network under different conditions. Computing devices that route traffic through a network may have specific goals defined for data flow. For example, the paths for routing packets through the network may be selected such that the packets are transmitted with short delivery times and without overloading portions of the network. It is challenging to determine appropriate routes for network traffic through a computer network that address such goals in the presence of changing network conditions, in real time, as discussed below.

SUMMARY

According to one aspect of the present disclosure, a computing device is provided, including a processor that receives a network graph and a specification of a network traffic control heuristic for a network traffic routing problem over the network graph. The processor constructs a gap maximization problem that has a difference between an exact solution and a heuristic solution to the traffic routing problem as a maximization target. The processor generates a Lagrange multiplier formulation of the gap maximization problem and computes an estimated maximum gap at a convex solver as an estimated solution to the Lagrange multiplier formulation. The processor performs a network traffic control action based at least in part on the estimated maximum gap.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

When routing traffic through computer networks, it is often desirable to process network traffic data in real time such that traffic flow patterns may be dynamically modified. Processing the network traffic data may include computing a solution to an optimization problem to find a minimum value of a loss function or a maximum value of a utility function. The inputs to the function that is minimized or maximized may include the amounts of network traffic assigned to different paths. Accordingly, when traffic is routed through the network, the amounts of traffic that solve the optimization problem may be assigned to the respective paths.

The optimization problem typically has a specific combination of input values that form an exact solution. An exact solution algorithm may be executed to find these input values. However, it is frequently not feasible to compute the exact minimum or maximum in real time due to the exact algorithm having high computational complexity. Heuristic approaches to network traffic flow management may accordingly be used to compute approximate solutions to optimization problems that arise during network traffic management. The approximate solutions may be utilized to dynamically adjust the flow of data along paths through the computer network.

Since the heuristic approaches to network traffic allocation find approximate solutions, there is frequently a gap between the approximate minimum or maximum and the exact minimum or maximum of the optimization function. This gap corresponds to an inefficiency of the allocation of network traffic. Depending on the properties of the network and the amounts of demand at different computing devices, the size of the gap may vary. Large gaps may occur in some scenarios, which may lead to high latency, low throughput, or other inefficiencies in network performance. The sizes of these gaps and the combinations of inputs under which they occur are not typically identifiable upon immediate inspection of the heuristic algorithms. Thus, it may be difficult to determine ahead of time that a particular network traffic routing heuristic will have inefficient performance in a particular scenario.

Figure 1:
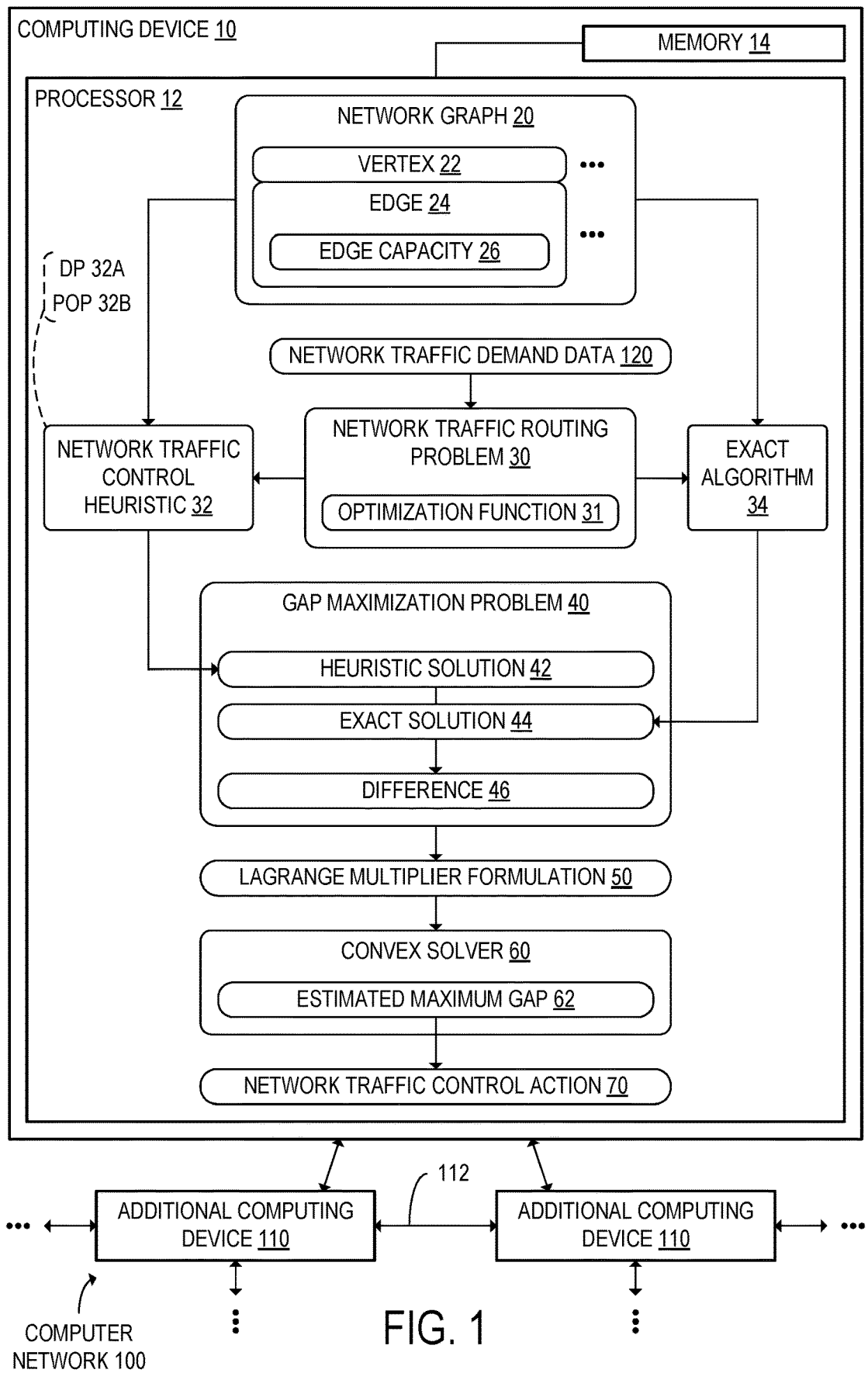
FIG. 1 schematically shows an example computing device that performs a network traffic control action within a computer network, according to one example embodiment.

In order to address the above challenges, a computing device 10 is provided, as shown in the example of FIG. 1. The computing device 10 is shown in the example of FIG. 1 as part of a computer network 100, along with a plurality of additional computing devices 110. The computer network 100 may, for example, be a wide area network (WAN) or a local area network (LAN). Each of the computing devices included in the computer network 100 is configured to communicate with one or more of the other computing devices. Thus, the devices included in the computer network 100 have a plurality of network links 112 between them.

The computing device 10 includes a processor 12 configured to execute instructions to perform computing processes. The processor 12 may be instantiated in a single physical processing device or in a plurality of processing devices. For example, the processor 12 may include one or more central processing units (CPUs), graphics processing units (GPUs), field-programmable gate arrays (FPGAs), specialized hardware accelerators, and/or other types of processing devices. The computing device 10 further includes memory 14 that is communicatively coupled to the processor 12. The memory 14 may, for example, include one or more volatile memory devices and/or one or more non-volatile memory devices.

As depicted in the example of FIG. 1, the processor 12 receives a network graph 20. The network graph 20 specifies a structure of at least a portion of the computer network 100 in which the computing device 10 is included. The network graph 20 includes a plurality of vertices 22 connected by a plurality of edges 24. In some examples, as shown in FIG. 1, the network graph 20 may further indicate a plurality of edge capacities 26 indicated as respective edge weights of the plurality of edges 24. The network graph 20 may be structured as a directed graph or an undirected graph.

At the processor 12, a network traffic routing problem 30 over the network graph 20 is specified. The network traffic routing problem 30 includes an optimization function 31 for which a minimum or maximum is computed when solving the network traffic routing problem 30. For example, the optimization function 31 may be a function that expresses a total flow, a weighted max-min fairness, or a utility curve. Other optimization functions 31 may alternatively be included in the network traffic routing problem 30. When solving the network traffic routing problem 30, one or more other computations may be performed in addition to computing a minimum or maximum of the optimization function 31. As discussed in further detail below, exact and approximate solutions to the network traffic routing problem 30 may be computed.

The processor 12 further receives a specification of a network traffic control heuristic 32 for the network traffic routing problem 30. The network traffic control heuristic 32 is a process by which a solution to the network traffic routing problem 30 may be approximated. For example, the network traffic control heuristic 32 may be a demand pinning heuristic 32A or a Partitioned Optimization Problems (POP) heuristic 32B, as discussed in further detail below. Using the network traffic control heuristic 32, the processor 12 generates a heuristic solution 42. Since the heuristic solution 42 is an approximation, the heuristic solution 42 may differ from an exact solution 44 to the network traffic routing problem 30.

The processor 12 further constructs a gap maximization problem 40. The gap maximization problem 40 has, as a maximization target, a difference 46 between the exact solution 44 to the network traffic routing problem 30 and the heuristic solution 42 generated using the network traffic control heuristic 32. The gap maximization problem may be expressed as follows:

$$\arg\max_{I \in ConstrainedSet} OPT(I) - \text{Heuristic}(I)$$

In the above expression, OPT is an exact algorithm 34 for solving the network traffic routing problem 30, Heuristic is the network traffic control heuristic 32, I is the input to the network traffic control heuristic 32 and the exact algorithm 34. The input I may, for example, be expressed as a vector. The input I may include network traffic demand data 120 for the additional computing devices 110 included in the computer network 100 or for the network links 112 that connect to the additional computing devices 110.

ConstrainedSet in the above expression for the gap maximization problem 40 is a set of possible values of the input I that satisfy feasibility constraints. The feasibility constraints for data flow over a set of network links 112 are given as follows:

$$\text{FeasibleFlow}(\mathcal{V}, \varepsilon, \mathcal{D}, \mathcal{P}) = \left\{ f \;\middle|\; \begin{array}{c} f_k = \sum_{p \in \mathcal{P}_k} f_k^p, \forall k \in \mathcal{D} \\ f_k \leq d_k, \forall k \in \mathcal{D} \\ \sum_{k,p \mid p \in \mathcal{P}_k, e \in p} f_k^p \leq c_e, \forall e \in \varepsilon \\ f_k^p \geq 0, \forall p \in \mathcal{P}, k \in \mathcal{D} \end{array} \right\}$$

In the above equation, $\mathcal{V}$ is the set of vertices 22 in the network graph 20, $\varepsilon$ is the set of edges 24, $\mathcal{D}$ is the set of demand quantities along the edges 24, and $\mathcal{P}$ is the set of paths between the vertices 22. Each path $p \in \mathcal{P}$ is a set of connected edges 24. In addition, $c_e$ is the capacity of an edge e, f is a flow assignment vector with elements $f_k$, and $f_k^p$ is the flow corresponding to a demand k and a path p, and $d_k$ is the total volume corresponding to the demand k. The kth element of $\mathcal{D}$ has source and target vertices $(s_k, t_k \in \mathcal{V})$ and has a non-negative volume $d_k$.

The first constraint shown in the above equation specifies that the flow $f_k$ corresponding the demand k is the sum of the flows $f_k^p$ for that level of demand k along each path p. The second constraint specifies that the flow for a demand k is less than or equal to the volume $d_k$ for that demand. The third constraint specifies that the flow $f_k^p$ along each path p for a given level of demand k is less than or equal to the capacity $c_e$ of that path. The fourth constraint specifies that each flow $f_k^p$ is non-negative.

In examples in which the network traffic routing problem 30 is a total flow maximization problem, the optimization function 31 may be expressed as follows:

$$Opt\text{MaxFlow}(\mathcal{V}, \varepsilon, \mathcal{D}, \mathcal{P}) \triangleq \arg\max_{f} \sum_{k \in \mathcal{D}} f_k$$

In the above equation, $f \in \text{FeasibleFlow}(\mathcal{V}, \varepsilon, \mathcal{D}, \mathcal{P})$. When the exact solution 44 is computed for the above optimization function 31, the total number of variables and constraints increases as a function of $|\mathcal{D}|+|\varepsilon|$. Under the worst-case scaling condition in which the network graph is fully connected, the number of demands $|\mathcal{D}|$ is given by:

$$|\mathcal{D}| = \binom{|\mathcal{V}|}{2} \approx |\mathcal{V}|^2$$

Thus, at large network sizes, the exact solution 44 to the network traffic routing problem 30 may be too slow to compute for use in real-time modeling and control of network traffic.

As discussed above, one network traffic control heuristic 32 that may be used to approximate the exact solution 44 is a demand pinning heuristic 32A. In demand pinning, flow is pre-allocated via the shortest respective paths between each pair of vertices 22 that has a demand $d_k$ below a configuration threshold $T_d$. Flow is allocated according to an exact value of $$\arg\max_{f} \Sigma_{k \in \mathcal{D}} f_k$$

for pairs of vertices 22 with demand $d_k$ above $T_d$. Thus, the dimension of the input space is reduced via preliminary "pinning" of the flow for pairs of vertices 22 with $d_k < T_d$. The reduced subset of FeasibleFlow($\mathcal{V}, \varepsilon, \mathcal{D}, \mathcal{P}$) under demand pinning is given by:
DemandPinning($\mathcal{D}, \mathcal{P}, T_d$)

$$\triangleq \left\{ f \mid \forall\, k \in \mathcal{D},\, d_k > T_d \vee f_k^p = \begin{cases} d_k & \text{if } p \text{ is shortest path in } P_k \\ 0 & \text{otherwise} \end{cases} \right\}$$

Thus, when demand pinning is used, ConstrainedSet is the set of inputs I for which either the demand is above the threshold or is routed along its corresponding shortest path. The network traffic routing problem 30 is therefore approximated as:

$$DemPin\text{MaxFlow}(\mathcal{V}, \varepsilon, \mathcal{D}, \mathcal{P}) \triangleq \arg\max_{f} \sum_{k \in \mathcal{D}} f_k$$

where $f \in$ FeasibleFlow($\mathcal{V}, \varepsilon, \mathcal{D}, \mathcal{P}$) and $f \in$ DemandPinning($\mathcal{D}, \mathcal{P}$).

Figures 2A, 2B:
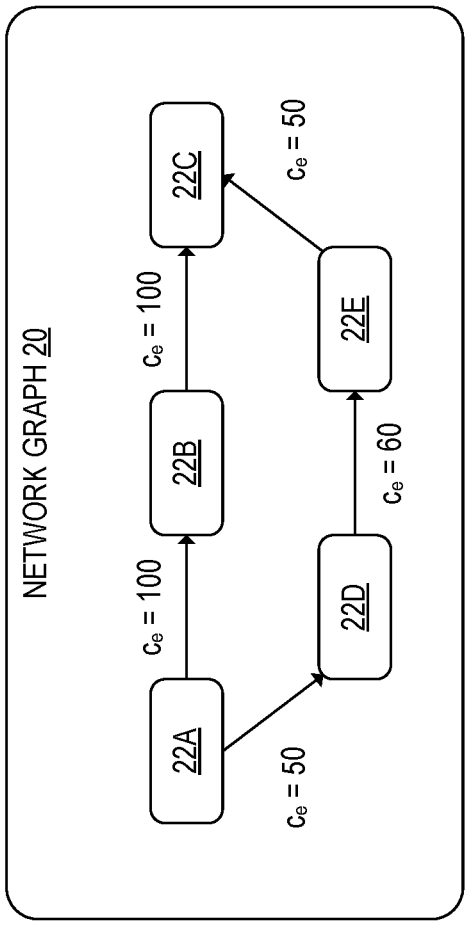
FIG. 2A shows an example network graph, according to the example of FIG. 1.
FIG. 2B shows a table that compares an output of a demand pinning heuristic to an exact solution to a network traffic routing problem for the example network graph of FIG. 2A.

FIGS. 2A-2B show an example comparison of the demand pinning heuristic 32A and exactly solving a network traffic routing problem 30 for an example network graph 20. FIG. 2A shows an example network graph 20 that includes vertices 22A, 22B, 22C, 22D, and 22E. The example network graph 20 of FIG. 2A further includes indications of the capacities $c_e$ of the edges 24.

FIG. 2B shows a table that includes demands associated with paths through the network graph 20 of FIG. 2A, as well as the values achieved using demand pinning and exact solving for different paths through the network graph 20. The configuration threshold $T_d$ used in the demand pinning heuristic 32A is set to 50 in the example of FIG. 2B. FIG. 2B further shows the total values achieved via demand pinning and exact solving. Demand pinning results in a total value of 160, whereas the optimal value given by the exact solution is 260. In the example of FIGS. 2A-2B, demand pinning accordingly has a 100-unit shortfall relative to the exact solution.

Figure 3:
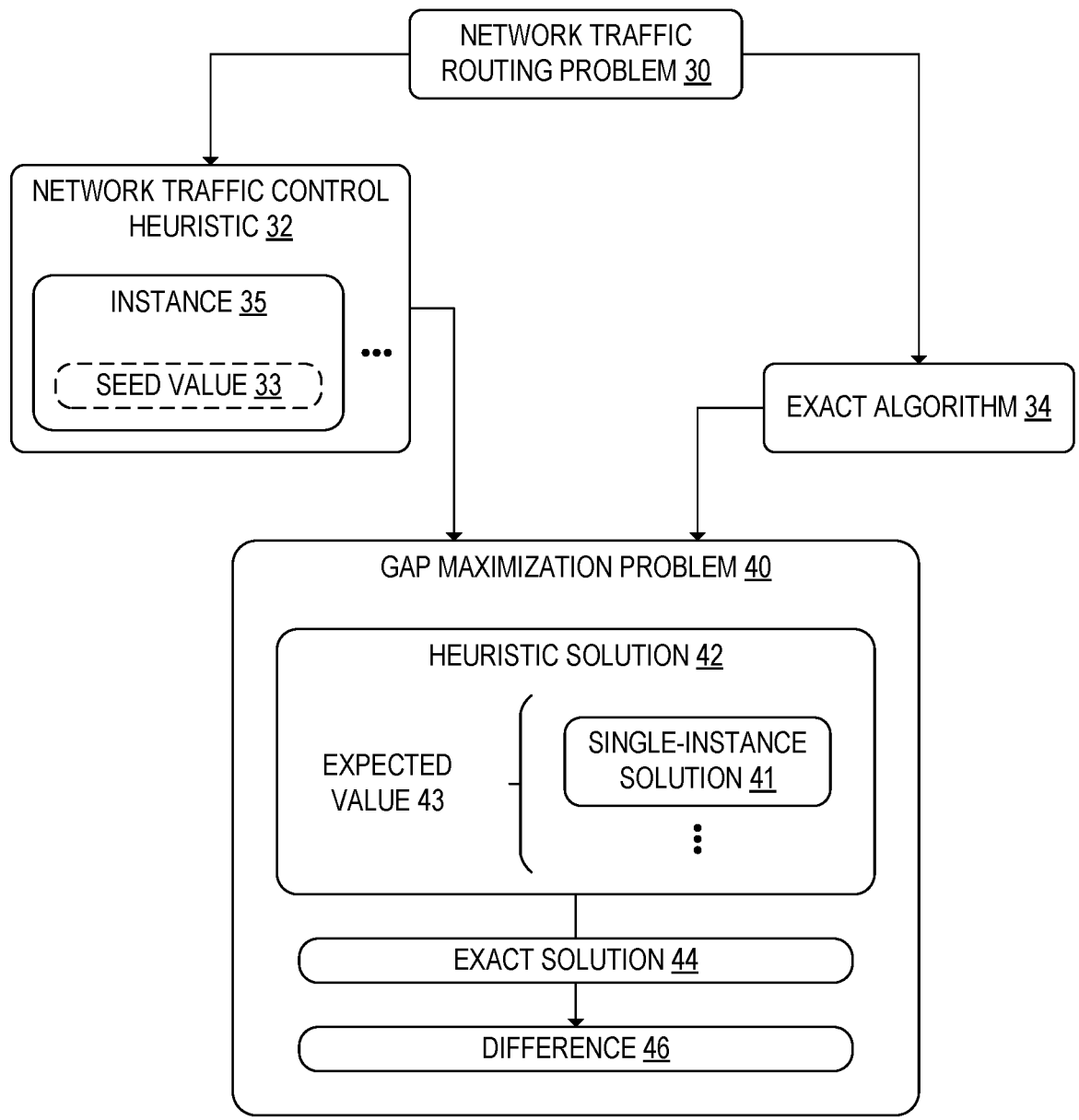
FIG. 3 schematically shows computation of a heuristic solution in an example in which a stochastic optimization heuristic is executed, according to the example of FIG. 1.

In some examples, as depicted in FIG. 3, the network traffic control heuristic 32 may be a stochastic optimization heuristic. For example, the POP heuristic 32B may be performed as a stochastic optimization heuristic. In examples in which the network traffic control heuristic 32 is a stochastic optimization heuristic, Monte Carlo approximation may be performed to generate the heuristic solution 42 to the network traffic routing problem 30. The network traffic control heuristic 32 may be nondeterministic or quasi-nondeterministic in such examples and may return different values of the heuristic solution 42 depending on seed values 33 that the network traffic control heuristic 32 receives as input. Thus, in the gap maximization problem 40, the heuristic solution 42 may be expressed as an expected value 43 over a plurality of instances 35 of the network traffic control heuristic 32. In some examples, the plurality of instances 35 may be quasi-randomly generated from a plurality of different seed values 33. Alternatively, true random number generation may be performed when executing the network traffic control heuristic 32. The expected value 43 may, for example, be computed as an average over a plurality of single-instance solutions 41 to the network traffic routing problem 30.

Returning to the example of FIG. 1, the processor 12 further generates a Lagrange multiplier formulation 50 of the gap maximization problem 40. By rewriting the gap maximization problem 40 in the Lagrange multiplier formulation 50, the processor 12 converts the gap maximization problem 40 from a two-stage optimization problem to a single-shot optimization problem. The gap maximization problem 40 may therefore be solved more efficiently in the Lagrange multiplier formulation 50, since solving nested optimization problems may be avoided.

Figure 4A:
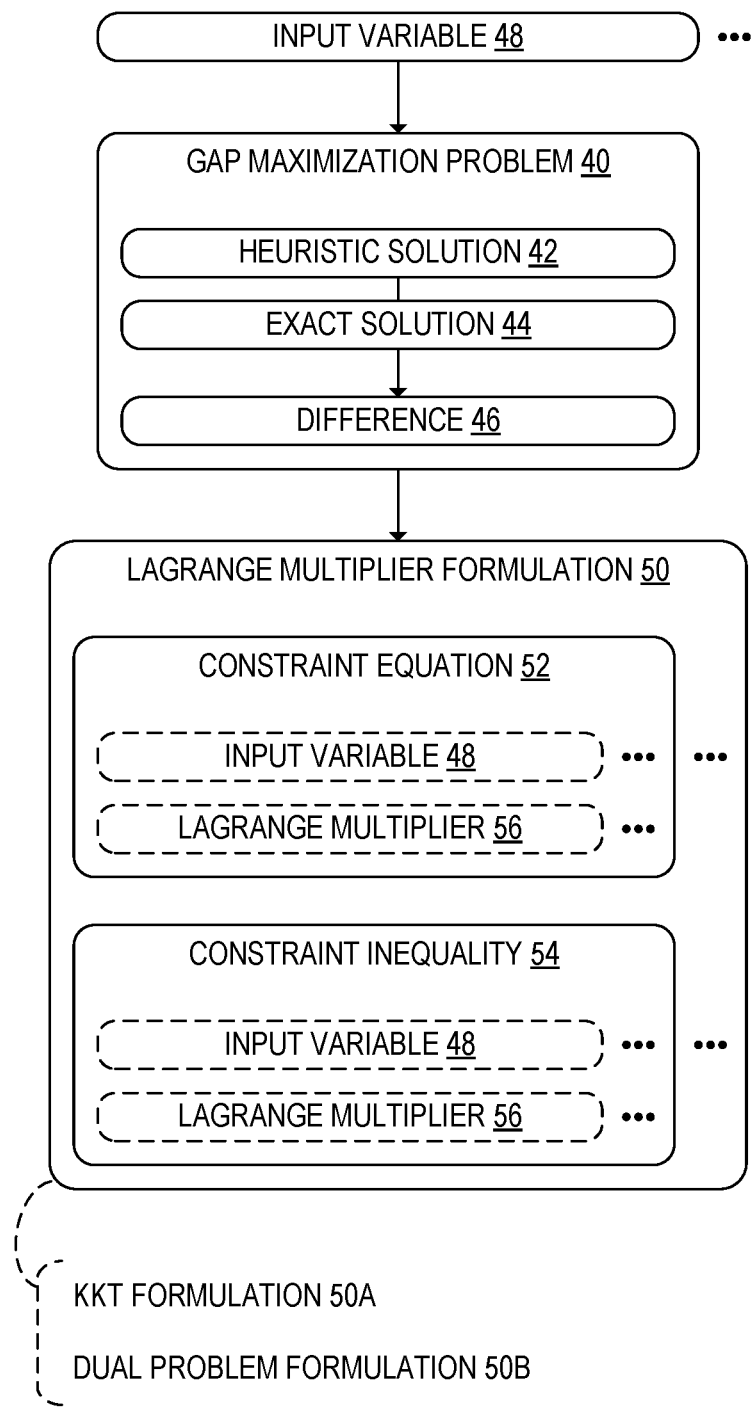
FIG. 4A schematically shows a Lagrange multiplier formulation of a gap maximization problem, according to the example of FIG. 1.

The Lagrange multiplier formulation 50 is shown in additional detail in the example of FIG. 4A. As shown in the example of FIG. 4A, the Lagrange multiplier formulation 50 includes a plurality of constraint equations 52 and a plurality of constraint inequalities 54. Each of the constraint equations 52 and the constraint inequalities 54 may include one or more of the input variables 48 of the gap maximization problem 40 and/or one or more Lagrange multipliers 56. Values of the input variables 48 may, for example, be included in the network traffic demand data 120. In this disclosure, the term "Lagrange multiplier" is understood to refer to additional variables (beyond the input variables 48) that are included in one or more of the constraint equations 52 and/or one or more of the constraint inequalities 54.

In some examples, the Lagrange multiplier formulation 50 is a Karush-Kuhn-Tucker (KKT) formulation 50A. In other examples, the Lagrange multiplier formulation 50 is a dual problem formulation 50B. In examples in which the Lagrange multiplier formulation 50 is the KKT formulation 50A, the Lagrange multiplier formulation 50 includes a plurality of first KKT multipliers $\mu_i$ and a plurality of second KKT multipliers $\lambda_j$ for $i=1, \ldots, m$ and $j=1, \ldots, l$, where m and l are the respective numbers of inequality constraints and equality constraints included in the gap maximization problem 40. The plurality of first KKT multipliers and the plurality of second KKT multipliers may be expressed in a first KKT multiplier vector and a second KKT multiplier vector. The KKT formulation 50A adds a variable for each inequality and an additional variable for each minimization of maximization objective. The KKT formulation 50A also adds a constraint for each variable in the original problem and an additional constraint for each newly added variable. Therefore, the increase in the number of variables that occurs when the gap maximization problem 40 is rewritten to obtain the KKT formulation 50A is provably given by a constant factor at most.

In examples in which the Lagrange multiplier formulation 50 is the dual problem formulation 50B, the gap maximization problem 40 is rewritten as a minimization problem. The solution to the dual problem formulation 50B is a lower bound on the solution to the KKT formulation 50A, which is the corresponding primal problem. Similarly to the KKT formulation 50A, the dual problem formulation 50B may include respective vectors of Lagrange multipliers 56 associated with the set of constraint equations 52 and the set of constraint inequalities 54. In the dual problem formulation 50B, the set of constraint equations 52 and the set of constraint inequalities 54 include the constraints of the KKT formulation 50A (referred to as the primal constraints) as well as one or more additional constraint equations 52 and one or more additional constraint inequalities 54 (referred to as the dual constraints). The dual constraints may be nonlinear when constructed using the dual problem formulation 50B. However, the Lagrange multiplier formulation 50 may be converted into a linear form by quantizing the input space of possible demand values.

Returning to the example of FIG. 1, the processor 12 further computes an estimated maximum gap 62 at the convex solver 60. The estimated maximum gap 62 is computed as an estimated solution to the Lagrange multiplier formulation 50 of the gap maximization problem 40. The convex solver 60 may, for example, encode the Lagrange multiplier formulation 50 using special ordered sets or disjunctions.

Figure 4B:
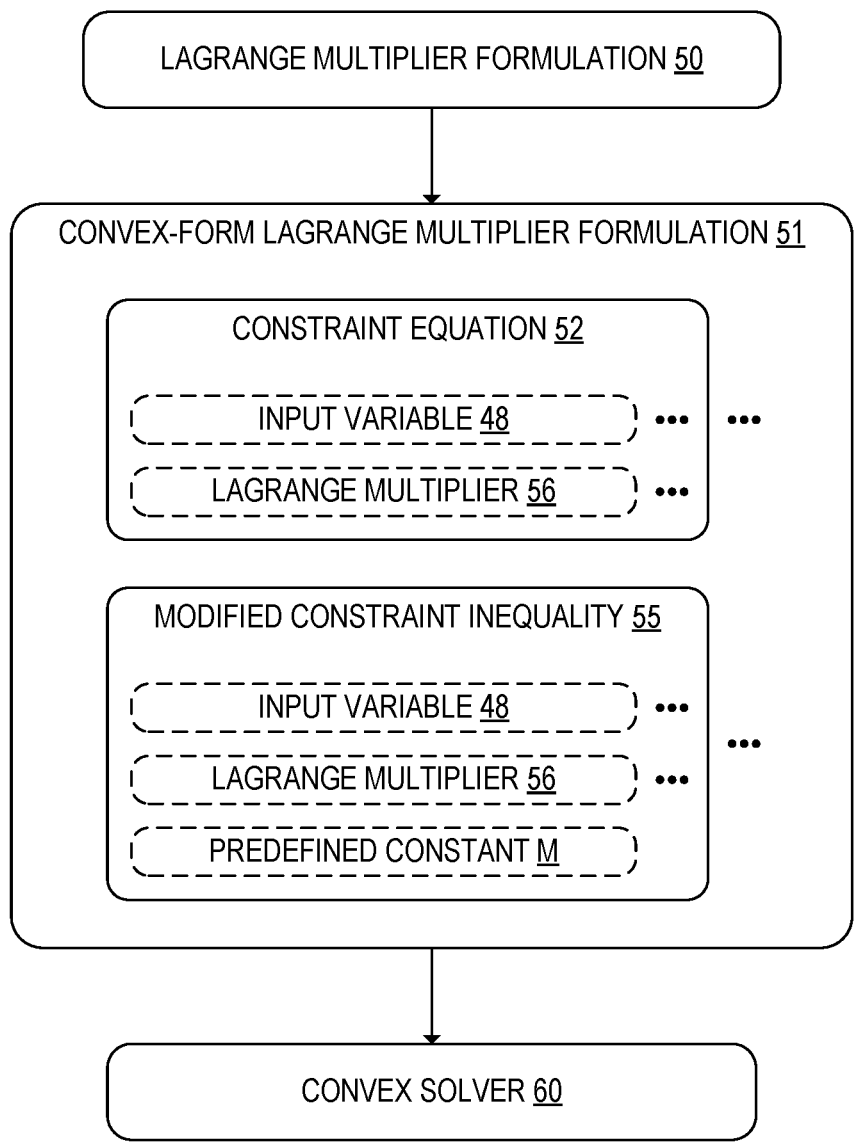
FIG. 4B schematically shows a convex-form Lagrange multiplier formulation generated from the Lagrange multiplier formulation, according to the example of FIG. 4A.

In some examples, when the Lagrange multiplier formulation 50 is initially generated, the Lagrange multiplier formulation 50 is not convex. Thus, as shown in the example of FIG. 4B, the processor 12 may generate a convex-form Lagrange multiplier formulation 51. The processor 12 may convert the Lagrange multiplier formulation 50 into a convex form using a big-M approach in which the one or more constraint inequalities 54 are replaced with one or more respective modified constraint inequalities 55. The modified constraint inequalities 55 may each include a predefined constant M, which may be set to a value larger than the edge capacity 26 of the highest-capacity edge 24 in the network graph 20. The Lagrange multiplier formulation 50 may accordingly be converted into a form in which it is solvable at the convex solver 60. At the convex solver 60, the processor 12 may further compute the estimated maximum gap 62 as an estimated solution to the convex-form Lagrange multiplier formulation 51.

The demand pinning heuristic 32A may, in some examples, be initially expressed in non-convex form. In examples in which the network traffic control heuristic 32 is the demand pinning heuristic 32A, the modified constraint inequalities 55 may be given as follows:

$$\sum_{p \in P_k, p \neq \hat{p}_k} f_k^p \leq \max(M(d_k - T_d), 0), \forall k \in \mathcal{D}$$

$$d_k - f_k^{\hat{p}_k} \leq \max(M(d_k - T_d), 0), \forall k \in \mathcal{D}$$

In the above modified constraint inequalities 55, $\hat{p}_k$ is the shortest path for demand k. Whenever the demand $d_k$ is below the configuration threshold $T_d$, the above constraints set the flow $f_k^p$ to zero on all paths other than the shortest path $\hat{p}_k$. In addition, on the shortest path $\hat{p}_k$, the allocated flow matches the demand $d_k$. Thus, the "or" condition in the demand pinning heuristic 32A may be encoded in the convex-form Lagrange multiplier formulation 51.

Figure 5:
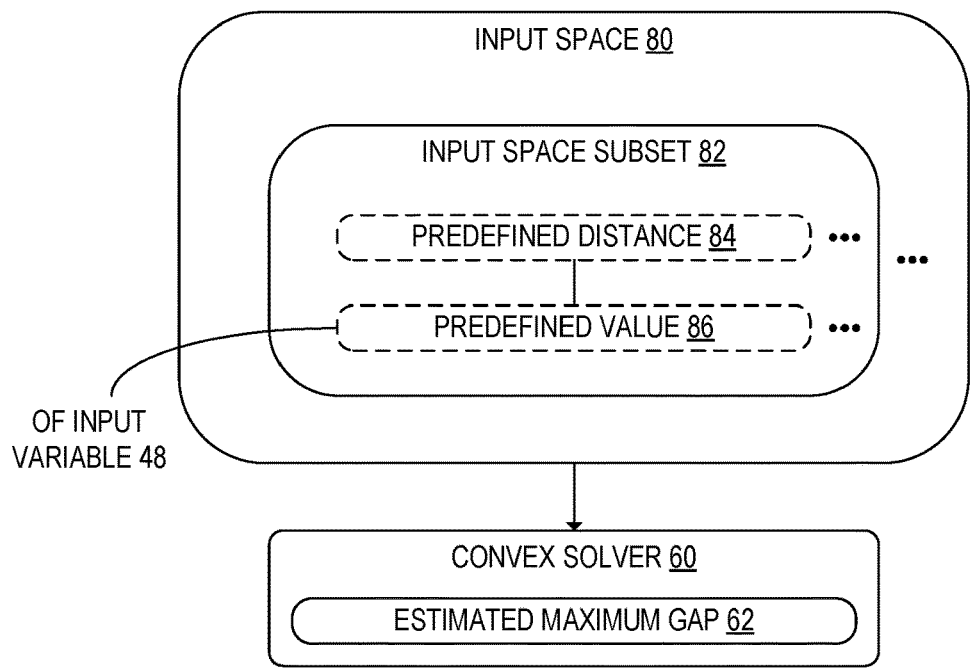
FIG. 5 schematically shows an input subspace that may be identified prior to computing an estimated maximum gap between the heuristic solution and the exact solution to the network traffic routing problem, according to the example of FIG. 1.

In some examples, when the estimated maximum gap 62 is computed at the convex solver 60, the values of the input variables 48 considered at the convex solver 60 may be subject to further constraints in addition to the constraints on f discussed above. As shown in the example of FIG. 5, the processor 12 may identify an input space subset 82 prior to computing the estimated maximum gap 62. The input space subset 82 may be a set of values of the one or more input variables 48 that is smaller than the full input space 80, and within which the processor 12 determines that the network traffic control heuristic 32 has the estimated maximum gap 62. In such examples, at the convex solver 60, the processor 12 computes the estimated maximum gap 62 over inputs included in the input space subset 82. Narrowing the input space 80 in this manner may allow the processor 12 to compute the estimated maximum gap 62 in a smaller amount of processing time.

According to one example, the processor 12 may utilize a distance in the input space 80 to select the input space subset 82. In such examples, the inputs included in the input space subset 82 may be within a predefined distance 84 from a predefined value 86 of at least one input variable 48. The distance may, for example, be an L2 norm. The predefined value 86 used as the benchmark for distance computation may, for example, be an average demand computed from historical network traffic data. In some examples, the input space subset 82 may be generated as a union over a plurality of regions of the input space 80 that are within respective predetermined distances 84 from corresponding predefined values 86 of the one or more input variables 48. For example, multiple predefined values 86 may be used as benchmarks when the network traffic has a multimodal distribution.

Figure 6A:
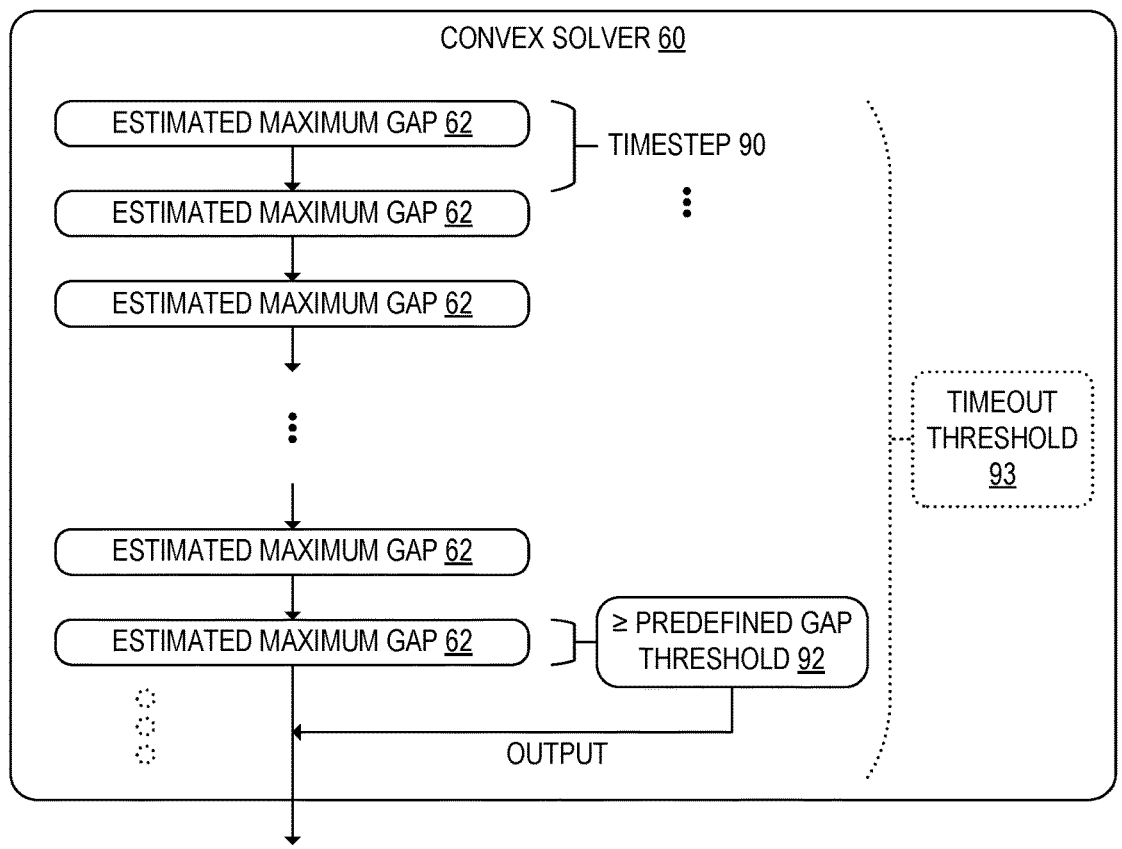
FIG. 6A schematically shows a convex solver in an example in which the convex solver computes the estimated maximum gap over a plurality of timesteps, according to the example of FIG. 1.

FIG. 6A schematically shows the convex solver 60 when the estimated maximum gap 62 is computed, according to one example. In the example of FIG. 6A, the processor 12 iteratively computes the estimated maximum gap 62 at the convex solver 60 over a plurality of timesteps 90. Thus, the processor 12 iteratively generates a plurality of values of the estimated maximum gap 62 prior to outputting a final value. In some examples, as shown in FIG. 6A, the processor 12 may iteratively compute the estimated maximum gap 62 at the convex solver 60 until the estimated maximum gap 62 is greater than or equal to a predetermined gap threshold 92. In such examples, timeout of the convex solver 60 may be used as another exit condition that occurs when the estimated maximum gap 62 remains below the predetermined gap threshold 92 after a number of timesteps equal to a timeout threshold 93.

Figure 6B:
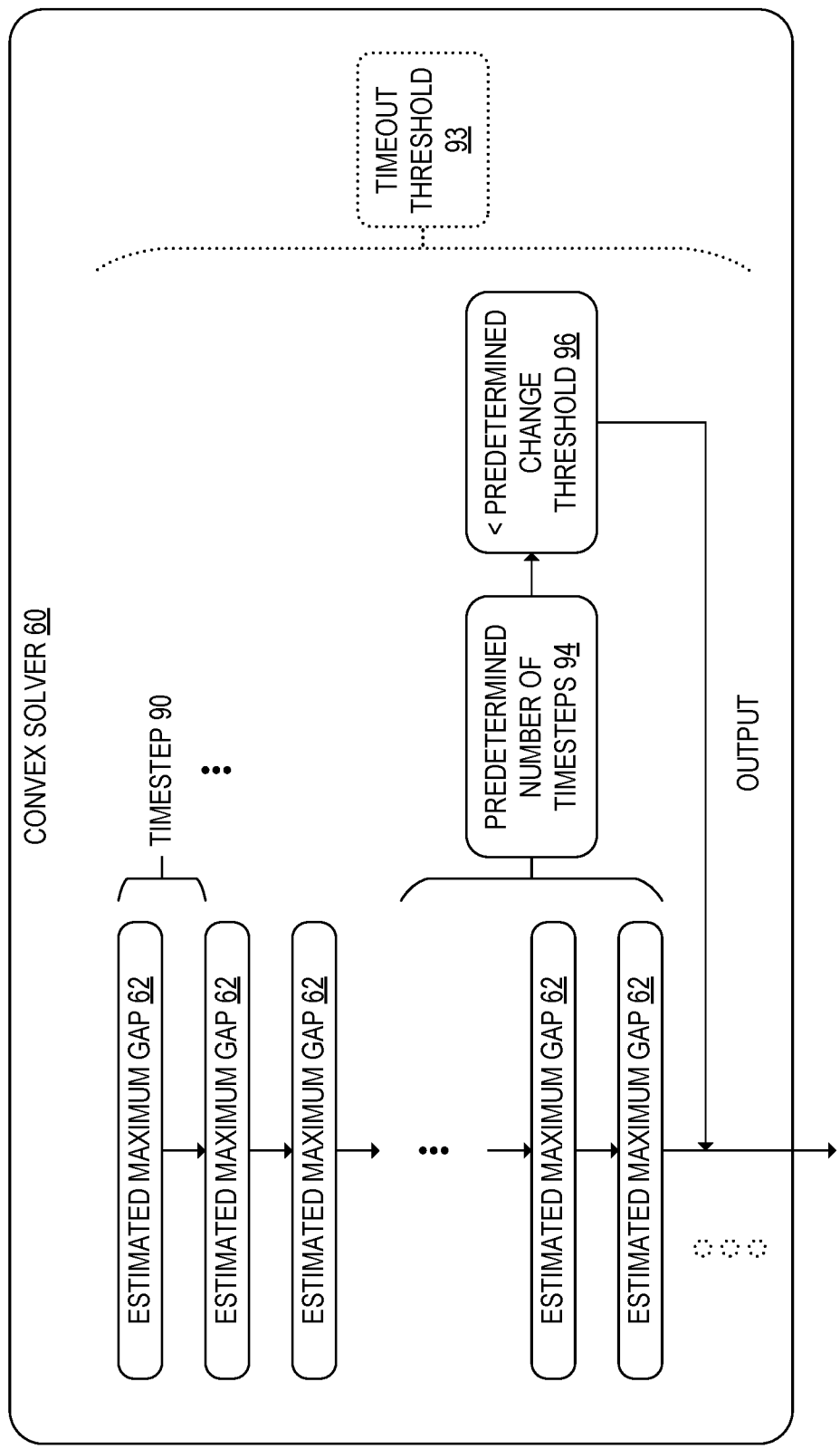
FIG. 6B schematically shows a convex solver in another example in which the convex solver computes the estimated maximum gap over a plurality of timesteps, according to the example of FIG. 1.

FIG. 6B schematically shows the convex solver 60 in another example in which the estimated maximum gap 62 is iteratively computed over a plurality of timesteps 90. In the example of FIG. 6B, the processor 12 determines that within a predetermined number of timesteps 94, the estimated maximum gap 62 has changed by an amount less than a predetermined change threshold 96. In such examples, in response to determining that the estimated maximum gap 62 has changed by the amount less than the predetermined change threshold 96, the processor 12 returns the estimated maximum gap 62 as output of the convex solver 60. Accordingly, when the processor 12 determines that the estimated maximum gap 62 has converged to a stable value, the convex solver 60 may return that value of the estimated maximum gap 62. The processor 12 may accordingly compute the estimated maximum gap 62 more quickly by skipping the timesteps 90 that would otherwise occur after convergence but before the timeout threshold 93.

Subsequently to computation of the estimated maximum gap 62, the processor 12 may utilize the value of the estimated maximum gap 62 when routing network traffic. As shown in FIG. 1, the processor 12 further performs a network traffic control action 70 based at least in part on the estimated maximum gap 62. In some examples, the network traffic control heuristic 32 is included among a plurality of network traffic control heuristics 32. In such examples, the network traffic control action 70 may be a selection of the network traffic control heuristic 32 from among the plurality of network traffic control heuristics 32 for implementation at the computer network 100. The network traffic control heuristic 32 selected when performing the network traffic control action 70 may be the network traffic control heuristic 32 that has the lowest estimated maximum gap 62 for current values of the input variables 48 to the gap maximization problem 40. For example, the processor 12 may select between the demand pinning heuristic 32A and the POP heuristic 32B.

In examples in which an input space subset 82 is identified and the estimated maximum gap 62 is computed for that input space subset 82, as shown in the example of FIG. 5, the network traffic control action 70 may be specific to that input space subset 82. In some examples, the processor 12 may identify a plurality of different input space subsets 82 of the input space 80 and may assign different network traffic control heuristics 32 to those input space subsets 82 based at least in part on the estimated maximum gaps 62 of the network traffic control heuristics 32 within those input space subsets 82. The processor 12 may assign the network traffic control heuristics 32 to the input space subsets 82 such that the estimated maximum gaps 62 respectively associated with the input space subsets 82 are reduced relative to using one network traffic control heuristic 32 over the entire input space 80. Thus, by applying a plurality of different network traffic control heuristics 32 to different input space subsets 82, solutions to the network traffic routing problem 30 may be estimated more accurately.

Figure 7:
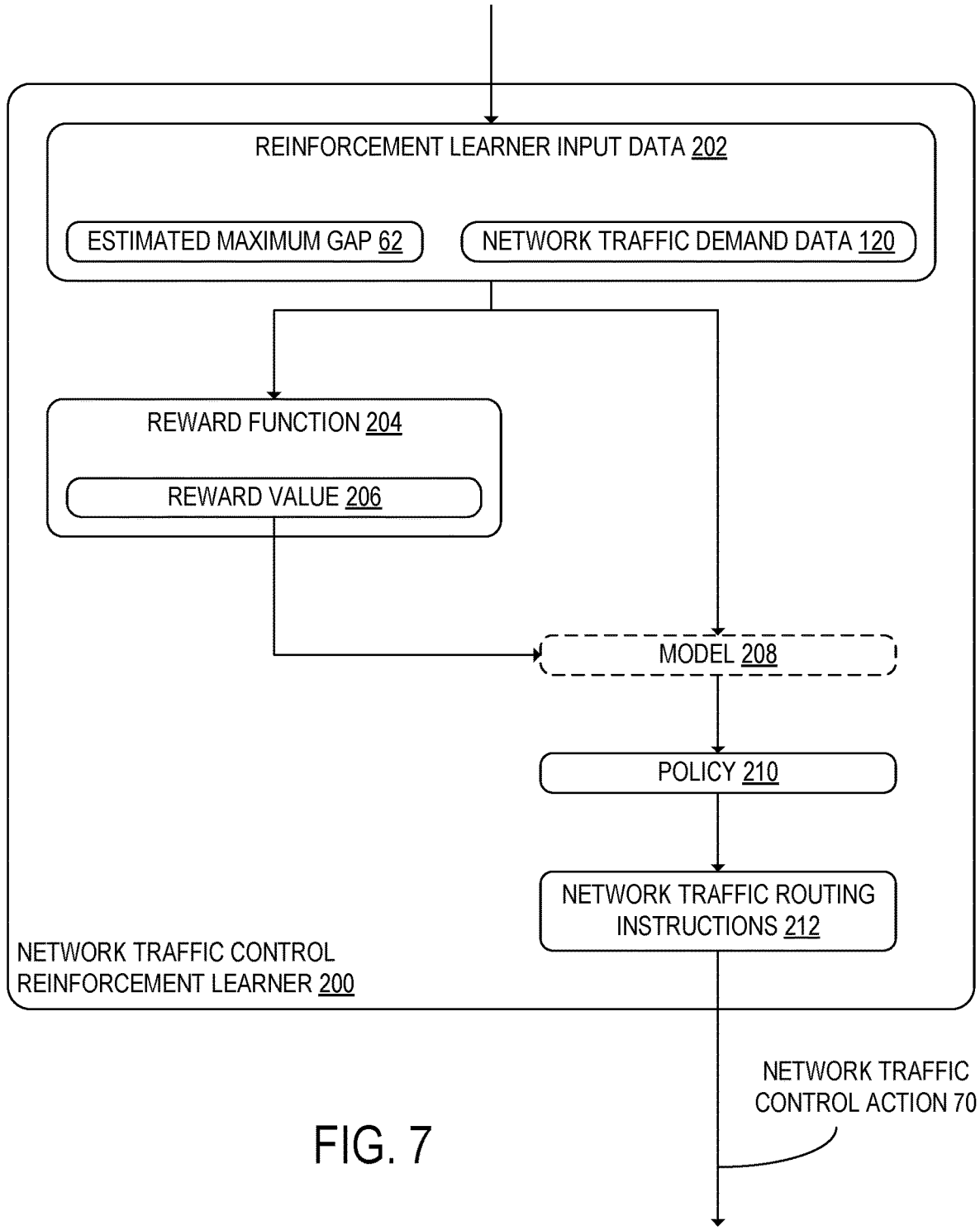
FIG. 7 schematically shows a network traffic control reinforcement learner that may be executed at the computing device to perform the network traffic control action, according to the example of FIG. 1.

In some examples, as depicted in FIG. 7, performing the network traffic control action 70 includes executing a network traffic control reinforcement learner 200 at the processor 12. According to the example of FIG. 7, executing the network traffic control reinforcement learner 200 includes receiving the estimated maximum gap 62 and the network traffic demand data 120 at the network traffic control reinforcement learner 200 as reinforcement learner input data 202. Using a reward function 204 of the network traffic control reinforcement learner 200, the processor 12 further computes a reward value 206 based at least in part on the estimated maximum gap 62 and the network traffic demand data 120. The reward value 206 may, for example, decrease as a function of the estimated maximum gap 62 and increase as a function of the total network traffic demand indicated in the network traffic demand data 120.

At the network traffic control reinforcement learner 200, the processor 12 further generates network traffic routing instructions 212 based at least in part on the reward value 206. The network traffic routing instructions 212 are generated as an output of a policy 210 of the network traffic control reinforcement learner 200. Thus, the network traffic control reinforcement learner 200 performs the network traffic control action 70.

Training may also be performed at the network traffic control reinforcement learner 200 based at least in part on the reward value 206, the estimated maximum gap 62, and the network traffic demand data 120. In some examples, the network traffic control reinforcement learner 200 may be a model-based reinforcement learner at which the policy 210 is computed during training via a model 208 that receives the reward value 206 and the reinforcement learner input data 202. In other examples, the network traffic control reinforcement learner 200 is a model-free reinforcement learner at which the policy 210 is learned directly from the reward values 206 and the reinforcement learner input data 202.

Figure 8:
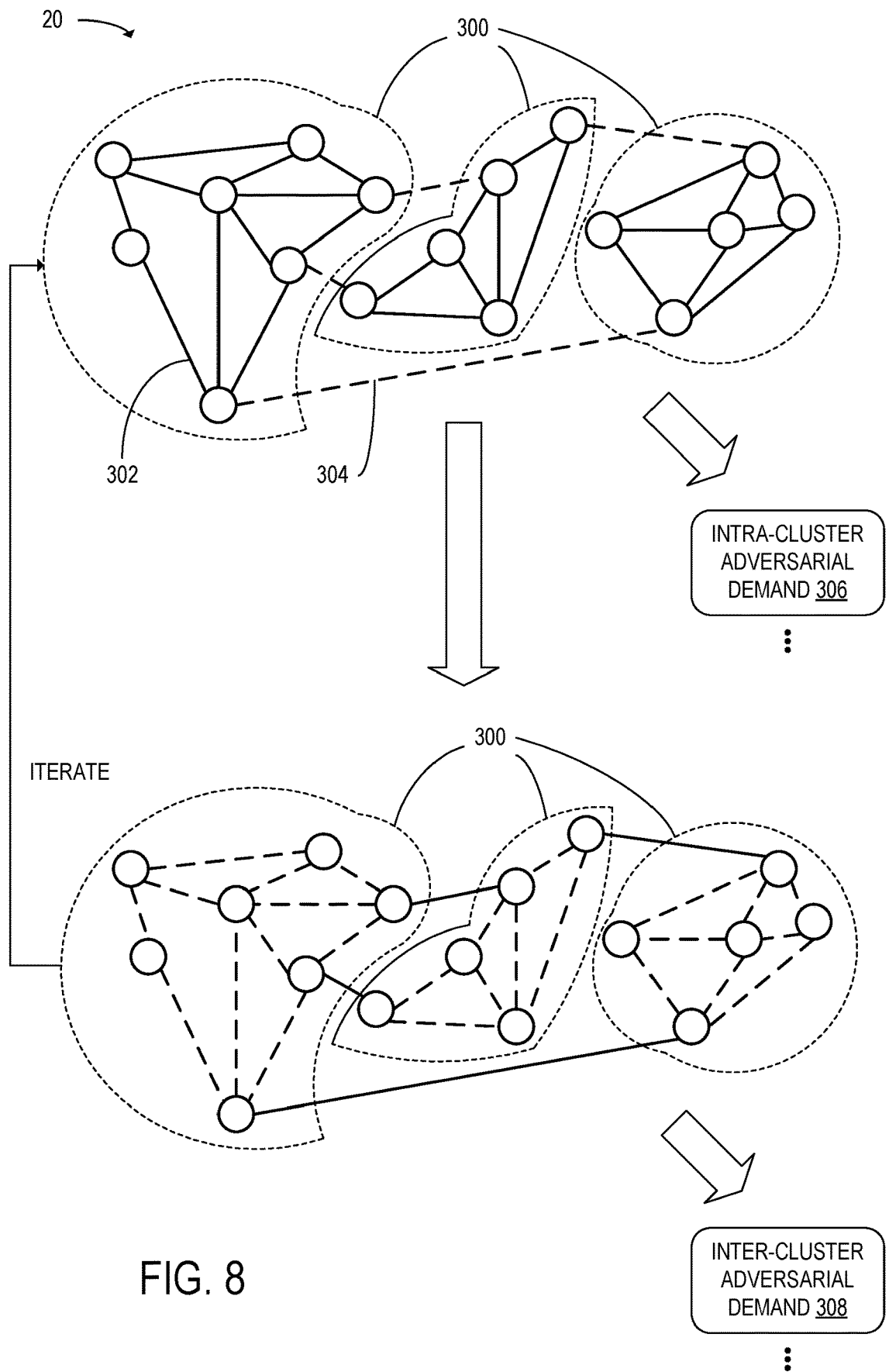
FIG. 8 schematically shows an example network graph divided into a plurality of clusters, according to the example of FIG. 1.

FIG. 8 schematically shows an example network graph 20 in which the plurality of vertices 22 are grouped into a plurality of clusters 300. The clusters 300 may, for example, be selected via spectral clustering or via some other cluster analysis technique. The edges 24 of the network graph 20 include a plurality of intra-cluster edges 302 between vertices 22 in the same cluster 300 and a plurality of inter-cluster edges 304 between vertices 22 in different clusters 300.

Subsequently to grouping the vertices 22 into clusters 300, the processor 12 further computes respective intra-cluster adversarial demands 306 associated with the clusters 300. The intra-cluster adversarial demands 306 for the clusters 300 are the network traffic demand data 120 along intra-cluster edges 302 that approximate maximum gaps between the heuristic solutions 42 and the exact solutions 44 for those clusters 300. Thus, the processor 12 solves instances of the gap maximization problem 40 for the individual clusters 300 without considering network traffic flow along the inter-cluster edges 304.

The processor 12 further computes inter-cluster adversarial demands 308 subsequently to computing the intra-cluster adversarial demands 306. The inter-cluster adversarial demands 308 are the network traffic demand data 120 along the inter-cluster edges 304 that approximate a solution to the gap maximization problem 40 when the network traffic demand along the intra-cluster edges 302 is treated as constant. In some examples, the processor 12 may estimate the plurality of inter-cluster adversarial demands 308 in a plurality of stages rather than estimating all the inter-cluster adversarial demands 308 concurrently. For example, the processor 12 may divide the network graph 20 using more than two clustering levels, such that the clusters 300 are further grouped into superclusters. The plurality of stages may correspond to the clustering levels in such examples.

The processor 12 may iteratively alternate between computing the intra-cluster adversarial demands 306 and the inter-cluster adversarial demands 308. When the adversarial demands are iteratively computed, the results of the previous adversarial demand computation may be used as the demand values that are held constant in the current adversarial demand computation. Over a plurality of iterations, the intra-cluster adversarial demands 306 and the inter-cluster adversarial demands 308 may converge to stable values. These stable values may form the set of demand values for which the network traffic control problem 30 has the estimated maximum gap 62. Using the cluster-based approach shown in FIG. 8 may allow the processor 12 to efficiently compute the estimated maximum gap 62 for larger network graphs 20 compared to techniques in which the estimated maximum gap 62 is computed for the entire network graph 20 in each timestep 90.

Figure 9A:
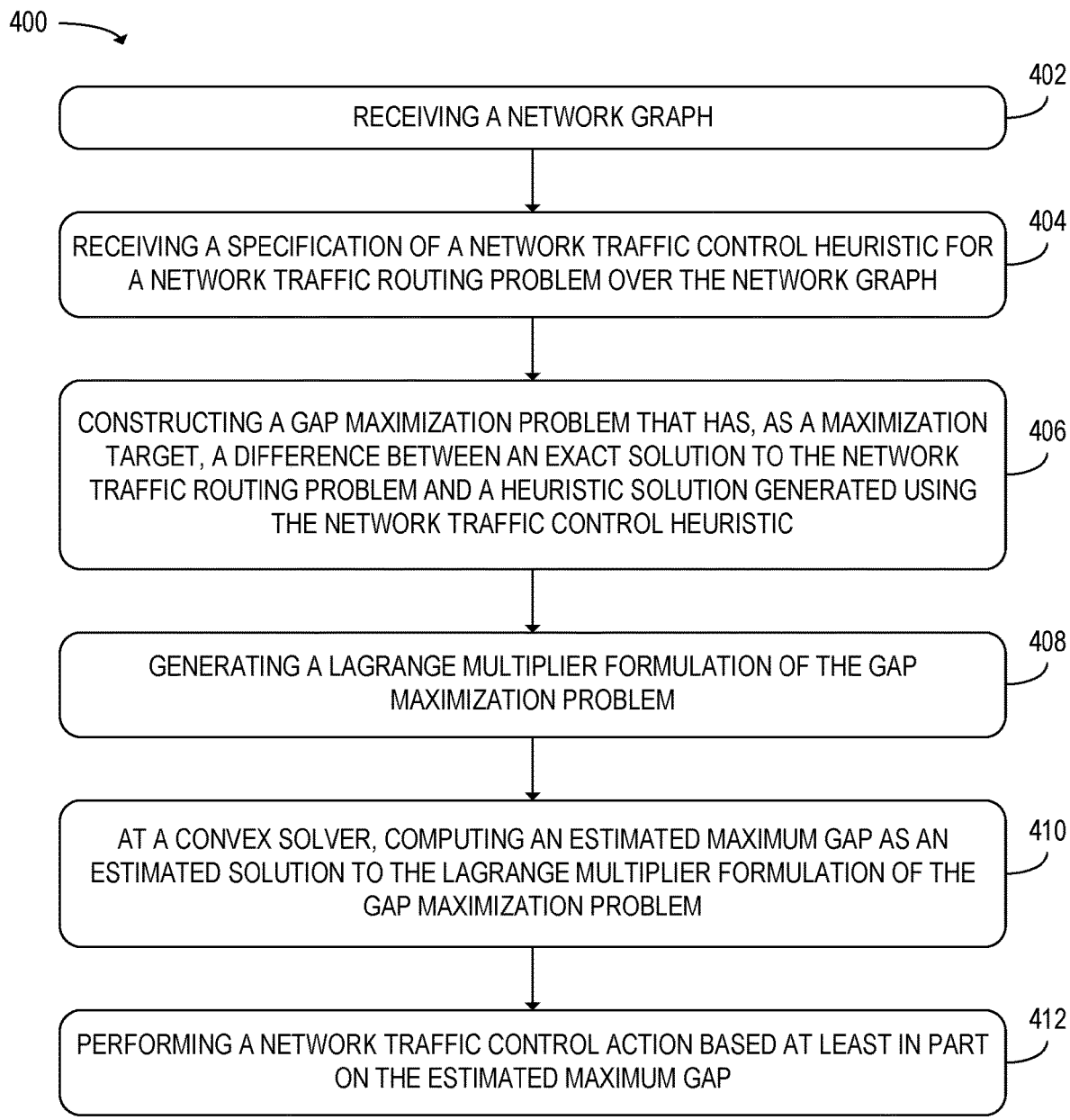
FIG. 9A shows a flowchart of an example method for use with a computing device to perform traffic routing at a computer network, according to the example of FIG. 1.
Figure 9B:
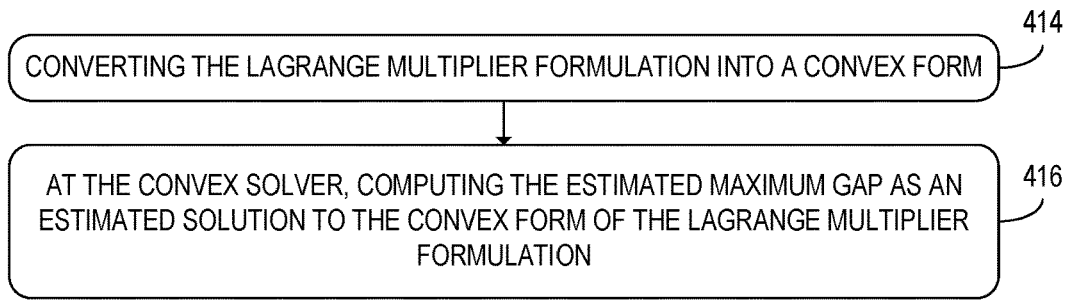
FIGS. 9B-9E show additional steps of the method of FIG. 9A that may be performed in some examples.

FIG. 9A shows a flowchart of an example method 400 for use with a computing device to perform traffic routing at a computer network. At step 402, the method 400 includes receiving a network graph. The network graph includes a plurality of vertices and a plurality of edges. In some examples, the vertices indicate computing devices, and the edges indicate connections between the computing devices. The edges may be directed or undirected and may have respective weights that indicate edge capacities of the connections between computing devices.

At step 404, the example method 400 of FIG. 9A further includes receiving a specification of a network traffic control heuristic for a network traffic routing problem over the network graph. The network traffic routing problem may be a minimization or maximization problem for an objective function. For example, the objective function may be a latency minimization objective function or a total flow maximization objective function. In examples in which the network traffic routing problem is a minimization or maximization problem, the network traffic control heuristic may be an algorithm by which the minimum or maximum of the objective function is approximated in a manner that is more efficient than computing the exact solution. The network traffic control heuristic may receive network traffic demand data associated with the network graph as input. In some examples, the network traffic control heuristic is a demand pinning heuristic. In other examples, the network traffic control heuristic is a Partitioned Optimization Problems (POP) heuristic. Network traffic control heuristics other than demand pinning and POP may alternatively be used in some examples.

At step 406, the method 400 further includes constructing a gap maximization problem. The gap maximization problem has, as a maximization target, a difference between an exact solution to the network traffic routing problem and a heuristic solution generated using the network traffic control heuristic. Thus, the gap maximization problem may be a nested optimization problem in which the maximization target of the gap maximization problem is in turn expressed as a solution to a minimization problem or a maximization problem.

At step 408, the method 400 further includes generating a Lagrange multiplier formulation of the gap maximization problem. In the Lagrange multiplier formulation, the gap maximization problem is rewritten as a single-shot optimization problem that does not include nested optimization steps. The Lagrange multiplier formulation of the gap maximization problem includes a plurality of constraint equations and a plurality of constraint inequalities. The constraint equations and the constraint inequalities may each include one or more input variables to the gap maximization problem, which may be variables included in the network traffic demand data. Each of the constraint equations and the constraint inequalities may additionally or alternatively include one or more Lagrange multipliers. In some examples, the Lagrange multiplier formulation is a Karush-Kuhn-Tucker (KKT) formulation. In other examples, the Lagrange multiplier formulation is a dual problem formulation.

At step 410, the method 400 further includes computing an estimated maximum gap at a convex solver. The estimated maximum gap is computed as an estimated solution to the Lagrange multiplier formulation of the gap maximization problem. At the convex solver, the estimated maximum gap may be computed as a difference between respective values of an exact solution to the network traffic routing problem computed via an exact algorithm and the heuristic solution computed via the network traffic control heuristic.

At step 412, the method 400 further includes performing a network traffic control action based at least in part on the estimated maximum gap. For example, the network traffic control action may include selection of the network traffic control heuristic from among a plurality of network traffic control heuristics. The selected network traffic control heuristic may then be implemented at the computer network. For example, the computing device may choose between demand pinning and POP. When the network traffic control action is performed, network traffic routing instructions may be generated at the computing device and transmitted to one or more additional computing devices included in the computer network.

FIGS. 9B-9E show additional steps of the method 400 of FIG. 9A that may be performed in some examples. The steps shown in FIG. 9B may be performed subsequently to generating the Lagrange multiplier formulation at step 408. At step 414, the method 400 may further include converting the Lagrange multiplier formulation into a convex form when computing the estimated solution to the Lagrange multiplier formulation of the gap maximization problem. For example, the convex form may be a big-M formulation of the gap maximization problem. At step 416, the method 400 may further include, at the convex solver, computing the estimated maximum gap as an solution to the convex form of the Lagrange multiplier formulation. Thus, a non-convex Lagrange multiplier formulation may be converted into a form at which it is solvable at the convex solver.

Figure 9C:
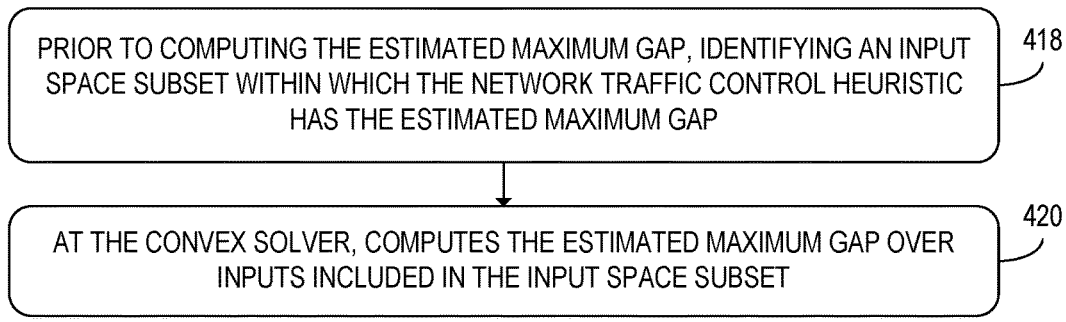

FIG. 9C shows additional steps of the method 400 that may be performed to speed up computation of the estimated maximum gap. At step 418, prior to computing the estimated maximum gap, the method 400 may further include identifying an input space subset within which the network traffic control heuristic has the estimated maximum gap compared to the exact algorithm. For example, the input space subset may be selected such that the inputs included in the input space subset are within a predefined distance from a predefined value of at least one input variable. At step 420, the method 400 may further include, at the convex solver, computing the estimated maximum gap over inputs included in the input space subset. The convex solver may compute the estimated maximum gap more efficiently by solving the Lagrange multiplier formulation over a reduced input space.

Figure 9D:
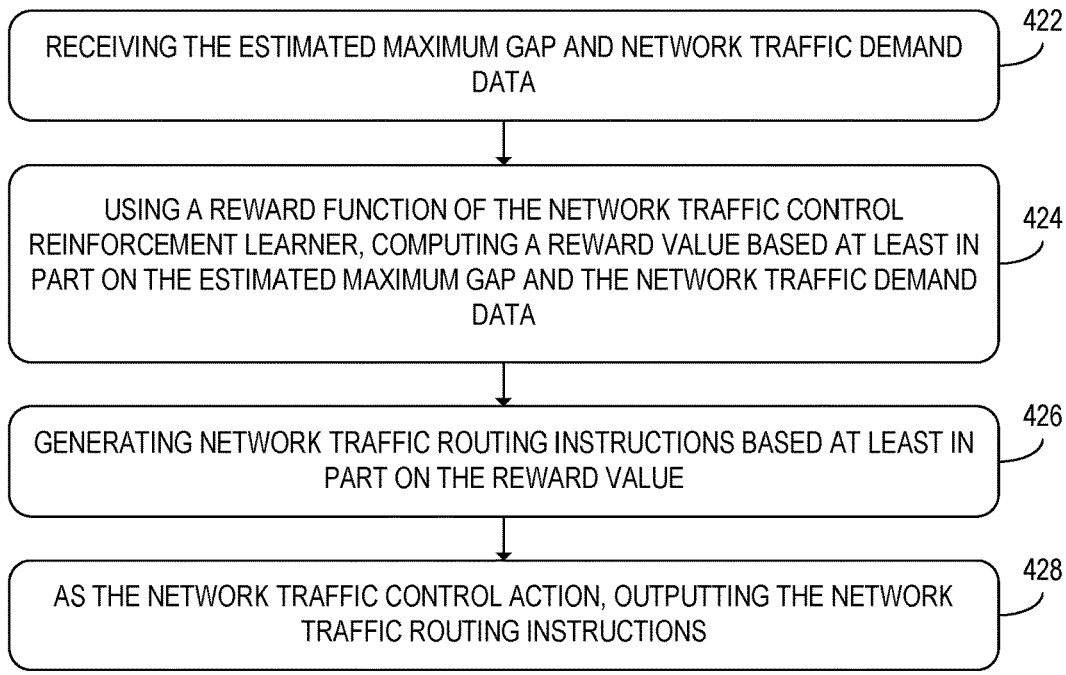

FIG. 9D shows steps of the method 400 that may be performed at a network traffic control reinforcement learner to perform the network traffic control action. The network traffic control reinforcement learner may be model-based or model-free. At step 422, the method 400 may further include receiving the estimated maximum gap and network traffic demand data at the network traffic control reinforcement learner. At step 424, the method 400 may further include computing a reward value based at least in part on the estimated maximum gap and the network traffic demand data using a reward function of the network traffic control reinforcement learner. The reward value may, for example, decrease as a function of the estimated maximum gap relative to the total demand. At step 426, the method 400 may further include generating network traffic routing instructions based at least in part on the reward value. At step 428, the method 400 may further include outputting the network traffic routing instructions as the network traffic control action. The network traffic routing instructions may be generated as an output of a policy of the network traffic control reinforcement learner. Thus, the network traffic control reinforcement learner may dynamically route traffic through the computer network.

Figure 9E:
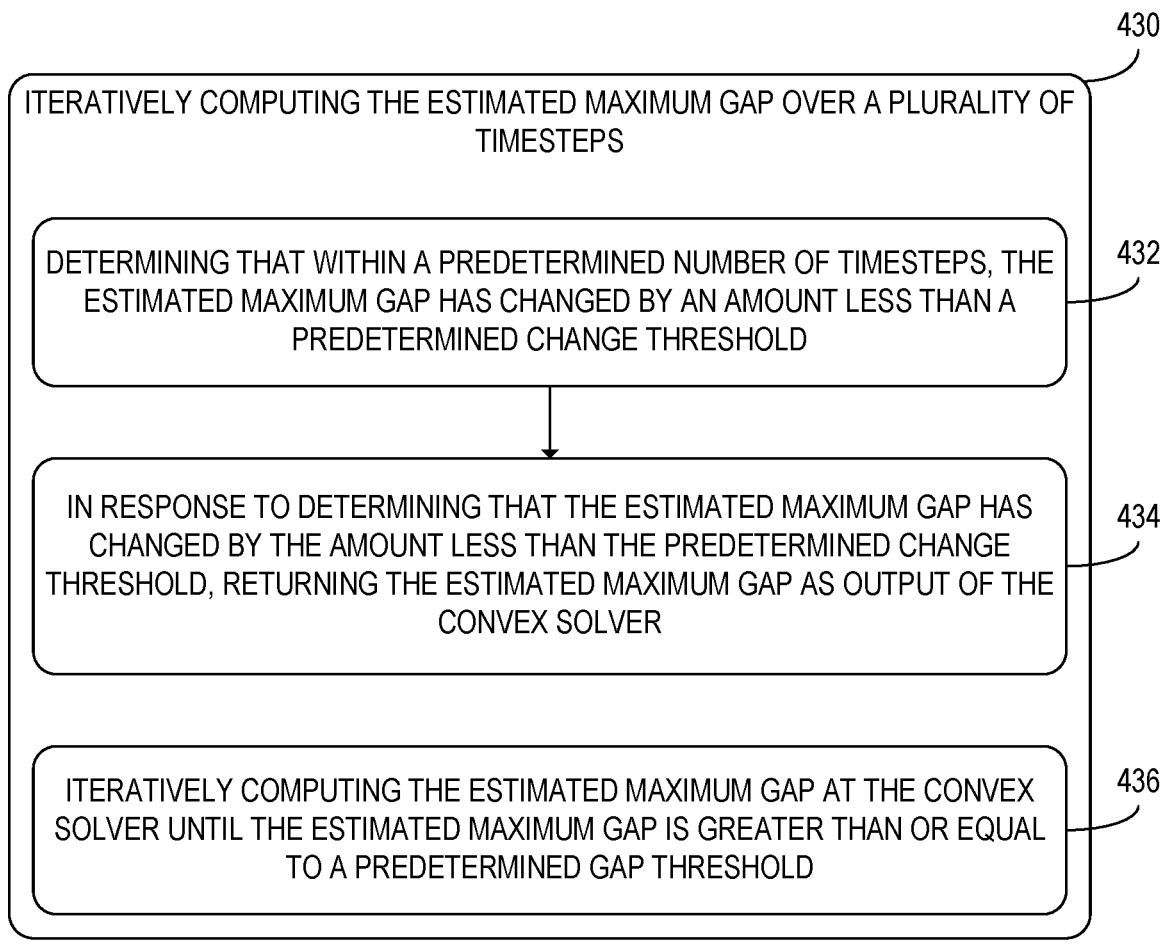

FIG. 9E shows additional steps of the method 400 that may be performed at the convex solver. At step 430, the method 400 may further include iteratively computing the estimated maximum gap over a plurality of timesteps. In some examples, at step 432, step 430 may include determining that within a predetermined number of timesteps, the estimated maximum gap has changed by an amount less than a predetermined change threshold. At step 434, in response to determining that the estimated maximum gap has changed by the amount less than the predetermined change threshold, step 430 further includes returning the estimated maximum gap as output of the convex solver. As an alternative to steps 432 and 434, step 430 may include, at step 436, iteratively computing the estimated maximum gap at the convex solver until the estimated maximum gap is greater than or equal to a predetermined gap threshold.

Using the devices and methods discussed above, an estimated maximum gap between a heuristic solution and an exact solution to a network traffic routing problem in a computer networking setting may be computed. The estimated maximum gap may then be used to programmatically route traffic through the computer network. For example, the estimated maximum gap may be used to select between different network traffic control heuristics. The devices and methods discussed above may allow traffic to be routed through the computer network in a manner that more accurately approximates a minimum or maximum of an optimization function defined in the network traffic routing problem.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
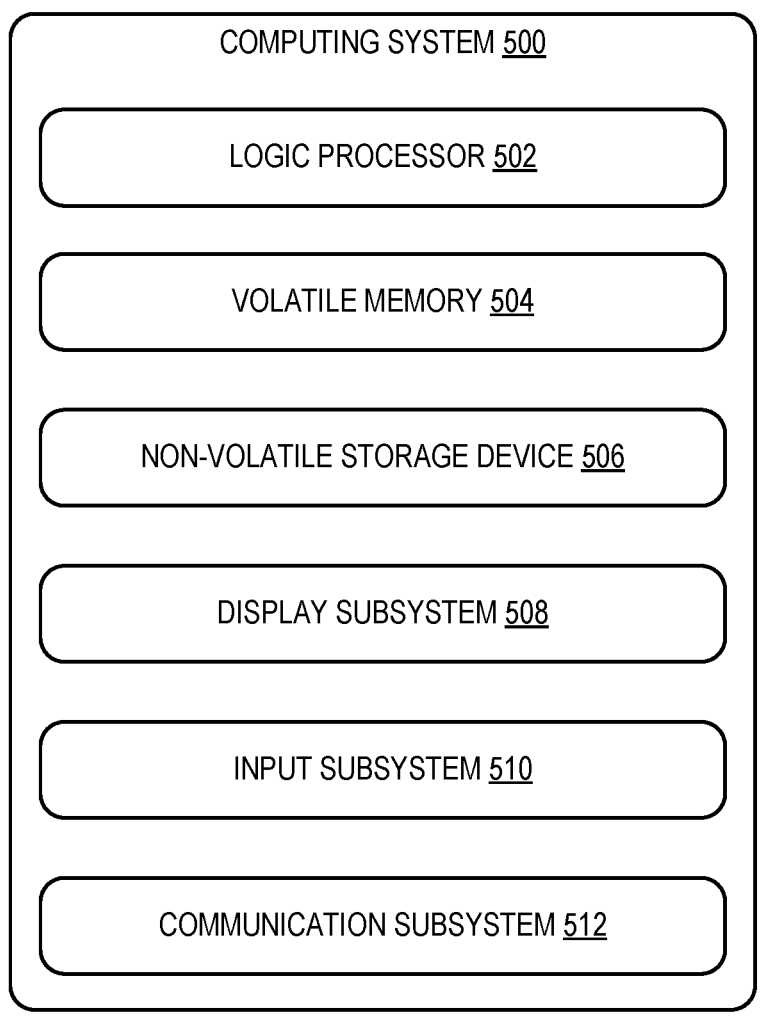
FIG. 10 shows a schematic view of an example computing environment in which the computing device of FIG. 1 may be instantiated.

FIG. 10 schematically shows a non-limiting embodiment of a computing system 500 that can enact one or more of the methods and processes described above. Computing system 500 is shown in simplified form. Computing system 500 may embody the computing device 10 described above and illustrated in FIG. 1. Components of the computing system 500 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display sub system 508, input sub system 510, communication sub system 512, and/or other components not shown in FIG. 10.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory, semiconductor memory, and/or magnetic memory, or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

The following paragraphs discuss several aspects of the present disclosure. According to one aspect of the present disclosure, a computing device is provided, including a processor that receives a network graph. The processor further receives a specification of a network traffic control heuristic for a network traffic routing problem over the network graph. The processor further constructs a gap maximization problem that has, as a maximization target, a difference between an exact solution to the network traffic routing problem and a heuristic solution generated using the network traffic control heuristic. The processor further generates a Lagrange multiplier formulation of the gap maximization problem. At a convex solver, the processor further computes an estimated maximum gap as an estimated solution to the Lagrange multiplier formulation of the gap maximization problem. The processor further performs a network traffic control action based at least in part on the estimated maximum gap. The above features may have the technical effect of efficiently selecting a network traffic control action that more closely achieves a user's network traffic routing objective.

According to this aspect, the Lagrange multiplier formulation may be a Karush-Kuhn-Tucker (KKT) formulation. This feature may have the technical effect of increasing the efficiency with which the estimated maximum gap is computed by rewriting nested optimization problems as a single-shot optimization problem.

According to this aspect, the Lagrange multiplier formulation may be a dual problem formulation. This feature may have the technical effect of increasing the efficiency with which the estimated maximum gap is computed by rewriting nested optimization problems as a single-shot optimization problem.

According to this aspect, the network traffic control heuristic may be a demand pinning heuristic. This feature may have the technical effect of computing the estimated maximum gap for a low-computational-cost heuristic that achieves high performance in many networks.

According to this aspect, the network traffic control heuristic may be a stochastic optimization heuristic. In the gap maximization problem, the heuristic solution may be expressed as an expected value over a plurality of instances of the network traffic control heuristic. The above features may have the technical effect of allowing the processor to compute more accurate values of the estimated maximum gap.

According to this aspect, the network traffic control heuristic may be a Partitioned Optimization Problems (POP) heuristic. This feature may have the technical effect of computing the estimated maximum gap for a low-computational-cost heuristic that achieves high performance in many networks.

According to this aspect, the processor may compute the estimated solution to the Lagrange multiplier formulation of the gap maximization problem at least in part by converting the Lagrange multiplier formulation into a convex form. Computing the estimated solution may further include, at the convex solver, computing the estimated maximum gap as an estimated solution to the convex form of the Lagrange multiplier formulation. The above features may have the technical effect of allowing the estimated maximum gap to be computed as a solution to a single-shot optimization problem when the original form of the Lagrange multiplier formulation is non-convex.

According to this aspect, the processor may, prior to computing the estimated maximum gap, identify an input space subset within which the network traffic control heuristic has the estimated maximum gap. At the convex solver, the processor may further compute the estimated maximum gap over inputs included in the input space subset. The above features may have the technical effect of allowing the estimated maximum gap to be computed more efficiently by narrowing the space of eligible inputs.

According to this aspect, the inputs included in the input space subset may be within a predefined distance from a predefined value of at least one input variable. This feature may have the technical effect of allowing the estimated maximum gap to be computed more efficiently by narrowing the input space to the set of inputs close to a benchmark value.

According to this aspect, the network traffic control action may be a selection of the network traffic control heuristic for implementation at a computer network from among a plurality of network traffic control heuristics. This feature may have the technical effect of allowing the processor to select between different heuristics based at least in part on the estimated maximum gap computed for a heuristic.

According to this aspect, the network traffic control action may include, at a network traffic control reinforcement learner, receiving the estimated maximum gap and network traffic demand data. The network traffic control action may further include, using a reward function of the network traffic control reinforcement learner, computing a reward value based at least in part on the estimated maximum gap and the network traffic demand data. The network traffic control action may further include generating network traffic routing instructions based at least in part on the reward value. The network traffic control action may further include outputting the network traffic routing instructions. The above features may have the technical effect of dynamically controlling network traffic in a manner that is informed by the value of the estimated maximum gap.

According to this aspect, at the convex solver, the processor may iteratively compute the estimated maximum gap over a plurality of timesteps. The processor may determine that within a predetermined number of timesteps, the estimated maximum gap has changed by an amount less than a predetermined change threshold. In response to determining that the estimated maximum gap has changed by the amount less than the predetermined change threshold, the processor may return the estimated maximum gap as output of the convex solver. The above features may have the technical effect of allowing the processor to determine when the estimated maximum gap computed at the convex solver has stabilized, thereby allowing the convex solver to skip computations that would otherwise be performed in later timesteps.

According to this aspect, the processor may iteratively compute the estimated maximum gap at the convex solver until the estimated maximum gap is greater than or equal to a predetermined gap threshold. The above features may have the technical effect of allowing the processor to more efficiently determine whether the estimated maximum gap has exceeded some threshold that is relevant to network traffic control.

According to another aspect of the present disclosure, a method for use with a computing device is provided. The method includes receiving a network graph. The method further includes receiving a specification of a network traffic control heuristic for a network traffic routing problem over the network graph. The method further includes constructing a gap maximization problem that has, as a maximization target, a difference between an exact solution to the network traffic routing problem and a heuristic solution generated using the network traffic control heuristic. The method further includes generating a Lagrange multiplier formulation of the gap maximization problem. At a convex solver, the method further includes computing an estimated maximum gap as an estimated solution to the Lagrange multiplier formulation of the gap maximization problem. The method further includes performing a network traffic control action based at least in part on the estimated maximum gap. The above features may have the technical effect of efficiently selecting a network traffic control action that more closely achieves a user's network traffic routing objective.

According to this aspect, the Lagrange multiplier formulation may be a Karush-Kuhn-Tucker (KKT) formulation. This feature may have the technical effect of increasing the efficiency with which the estimated maximum gap is computed by rewriting nested optimization problems as a single-shot optimization problem.

According to this aspect, the Lagrange multiplier formulation may be a dual problem formulation. This feature may have the technical effect of increasing the efficiency with which the estimated maximum gap is computed by rewriting nested optimization problems as a single-shot optimization problem.

According to this aspect, the network traffic control heuristic may be a demand pinning heuristic. This feature may have the technical effect of computing the estimated maximum gap for a low-computational-cost heuristic that achieves high performance in many networks.

According to this aspect, the network traffic control heuristic may be a Partitioned Optimization Problems (POP) heuristic. This feature may have the technical effect of computing the estimated maximum gap for a low-computational-cost heuristic that achieves high performance in many networks.

According to this aspect, computing the estimated solution to the Lagrange multiplier formulation of the gap maximization problem may include converting the Lagrange multiplier formulation into a convex form. Computing the estimated solution may further include, at the convex solver, computing the estimated maximum gap as an estimated solution to the convex form of the Lagrange multiplier formulation. The above features may have the technical effect of allowing the estimated maximum gap to be computed as a solution to a single-shot optimization problem when the original form of the Lagrange multiplier formulation is non-convex.

According to another aspect of the present disclosure, a computing device is provided, including a processor that receives a network graph. The processor further receives a specification of a network traffic control heuristic for a network traffic routing problem over the network graph. The network traffic control heuristic is included among a plurality of network traffic control heuristics. The processor further constructs a gap maximization problem that has, as a maximization target, a difference between an exact solution to the network traffic routing problem and a heuristic solution generated using the network traffic control heuristic. The processor further generates a Lagrange multiplier formulation of the gap maximization problem. At a convex solver, the processor further computes an estimated maximum gap as an estimated solution to the Lagrange multiplier formulation of the gap maximization problem. Based at least in part on the estimated maximum gap, the processor further selects the network traffic control heuristic for implementation at a computer network from among the plurality of network traffic control heuristics. The processor further receives network traffic demand data. The processor further generates network traffic routing instructions at least in part by inputting the network traffic demand data into the network traffic control heuristic. The processor further outputs the network traffic routing instructions. The above features may have the technical effect of efficiently selecting a network traffic control heuristic that more closely achieves a user's network traffic routing objective.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing device comprising:
   a processor that:
      receives a network graph;

receives a specification of a network traffic control heuristic for a network traffic routing problem over the network graph;

constructs a gap maximization problem that has, as a maximization target, a difference between an exact solution to the network traffic routing problem and a heuristic solution generated using the network traffic control heuristic;

generates a Lagrange multiplier formulation of the gap maximization problem based on the difference;

at a convex solver, computes an estimated maximum gap as an estimated solution to the Lagrange multiplier formulation of the gap maximization problem; and performs a network traffic control action based at least in part on the estimated maximum gap.

2. The computing device of claim 1, wherein the Lagrange multiplier formulation is a Karush-Kuhn-Tucker (KKT) formulation.

3. The computing device of claim 1, wherein the Lagrange multiplier formulation is a dual problem formulation.

4. The computing device of claim 1, wherein the network traffic control heuristic is a demand pinning heuristic.

5. The computing device of claim 1, wherein:
the network traffic control heuristic is a stochastic optimization heuristic; and
in the gap maximization problem, the heuristic solution is expressed as an expected value over a plurality of instances of the network traffic control heuristic.

6. The computing device of claim 5, wherein the network traffic control heuristic is a Partitioned Optimization Problems (POP) heuristic.

7. The computing device of claim 1, wherein the processor computes the estimated solution to the Lagrange multiplier formulation of the gap maximization problem at least in part by:
converting the Lagrange multiplier formulation into a convex form; and
at the convex solver, computing the estimated maximum gap as an estimated solution to the convex form of the Lagrange multiplier formulation.

8. The computing device of claim 1, wherein the processor further:
prior to computing the estimated maximum gap, identifies an input space subset within which the network traffic control heuristic has the estimated maximum gap; and
at the convex solver, computes the estimated maximum gap over inputs included in the input space subset.

9. The computing device of claim 8, wherein the inputs included in the input space subset are within a predefined distance from a predefined value of at least one input variable.

10. The computing device of claim 1, wherein the network traffic control action is a selection of the network traffic control heuristic for implementation at a computer network from among a plurality of network traffic control heuristics.

11. The computing device of claim 1, wherein the network traffic control action includes, at a network traffic control reinforcement learner:
receiving the estimated maximum gap and network traffic demand data;
using a reward function of the network traffic control reinforcement learner, computing a reward value based at least in part on the estimated maximum gap and the network traffic demand data;
generating network traffic routing instructions based at least in part on the reward value; and as the network traffic control action, outputting the network traffic routing instructions.

12. The computing device of claim 1, wherein, at the convex solver, the processor further:
iteratively computes the estimated maximum gap over a plurality of timesteps;
determines that within a predetermined number of timesteps, the estimated maximum gap has changed by an amount less than a predetermined change threshold; and
in response to determining that the estimated maximum gap has changed by the amount less than the predetermined change threshold, returns the estimated maximum gap as output of the convex solver.

13. The computing device of claim 1, wherein the processor iteratively computes the estimated maximum gap at the convex solver until the estimated maximum gap is greater than or equal to a predetermined gap threshold.

14. A method for use with a computing device, the method comprising:
receiving a network graph;
receiving a specification of a network traffic control heuristic for a network traffic routing problem over the network graph;
constructing a gap maximization problem that has, as a maximization target, a difference between an exact solution to the network traffic routing problem and a heuristic solution generated using the network traffic control heuristic;
generating a Lagrange multiplier formulation of the gap maximization problem based on the difference;
at a convex solver, computing an estimated maximum gap as an estimated solution to the Lagrange multiplier formulation of the gap maximization problem; and
performing a network traffic control action based at least in part on the estimated maximum gap.

15. The method of claim 14, wherein the Lagrange multiplier formulation is a Karush-Kuhn-Tucker (KKT) formulation.

16. The method of claim 14, wherein the Lagrange multiplier formulation is a dual problem formulation.

17. The method of claim 14, wherein the network traffic control heuristic is a demand pinning heuristic.

18. The method of claim 14, wherein the network traffic control heuristic is a Partitioned Optimization Problems (POP) heuristic.

19. The method of claim 14, wherein computing the estimated solution to the Lagrange multiplier formulation of the gap maximization problem includes:
converting the Lagrange multiplier formulation into a convex form; and
at the convex solver, computing the estimated maximum gap as an estimated solution to the convex form of the Lagrange multiplier formulation.

20. A computing device comprising:
a processor that:
receives a network graph;
receives a specification of a network traffic control heuristic for a network traffic routing problem over the network graph, wherein the network traffic control heuristic is included among a plurality of network traffic control heuristics;
constructs a gap maximization problem that has, as a maximization target, a difference between an exact solution to the network traffic routing problem and a heuristic solution generated using the network traffic control heuristic;

generates a Lagrange multiplier formulation of the gap maximization problem based on the difference;
at a convex solver, computes an estimated maximum gap as an estimated solution to the Lagrange multiplier formulation of the gap maximization problem;
based at least in part on the estimated maximum gap, selects the network traffic control heuristic for implementation at a computer network from among the plurality of network traffic control heuristics;
receives network traffic demand data; and
generates network traffic routing instructions at least in part by inputting the network traffic demand data into the network traffic control heuristic; and
outputs the network traffic routing instructions.

\* \* \* \* \*